United States Patent [19]

Koller

[11] Patent Number: 4,955,670
[45] Date of Patent: Sep. 11, 1990

[54] SHIELD FOR DETAILING VEHICLE TIRES

[76] Inventor: William R. Koller, 12235 W. 61st Ave., Arvada, Colo. 80004

[21] Appl. No.: 370,822

[22] Filed: Jun. 23, 1989

[51] Int. Cl.$^5$ .......................... B60B 7/00; B05C 21/00
[52] U.S. Cl. ................................ 301/37 R; 301/37 P; 118/505
[58] Field of Search ............ 301/37 R, 37 ST, 37 TC, 301/37 P, 37 T, 108 R, 108 A; 118/504, 505; 150/52 K

[56] References Cited

U.S. PATENT DOCUMENTS

| | | | |
|---|---|---|---|
| 1,424,199 | 8/1922 | Humelbau | 118/505 |
| 2,580,543 | 1/1952 | Henderson | 301/37 |
| 2,627,839 | 2/1953 | Hudgins et al. | 118/505 |
| 3,007,401 | 11/1961 | Kordenbrock | 101/127 |
| 3,192,896 | 7/1965 | Irving | 118/505 |
| 3,565,489 | 2/1971 | Eirinberg et al. | 301/37 SA |
| 3,854,448 | 12/1974 | Kromanaker | 118/505 |
| 3,864,860 | 2/1975 | Merzweiler | 40/587 |
| 4,628,858 | 12/1986 | King et al. | 118/504 |
| 4,784,440 | 11/1988 | Fair | 301/37 R |
| 4,792,191 | 12/1988 | Farmer | 301/37 R |

Primary Examiner—Russell D. Stormer
Attorney, Agent, or Firm—John E. Reilly

[57] ABSTRACT

A temporary shield for covering a vehicle wheel in the course of applying a detailing solution to the sidewall of a vehicle tire seated on the rim of the wheel and comprising a generally disk-shaped body having a plurality of circumferentially extending markings in spaced concentric relation to one another relatively near the outer peripheral edge of the body and away from the center of the body to define circumferential lines of separation for selective removal of the circumferential portions radially outwardly of a selected marking so as to size the body to the size of the wheel. The body is of generally conical configuration and the markings are defined by circumferentially extending shoulder portions concentric to one another and to the outer peripheral portion of the wheel so that when the body is cut to size to fit a particular size of wheel the shoulder portion will fit snugly over the outer peripheral portion of the wheel.

12 Claims, 1 Drawing Sheet

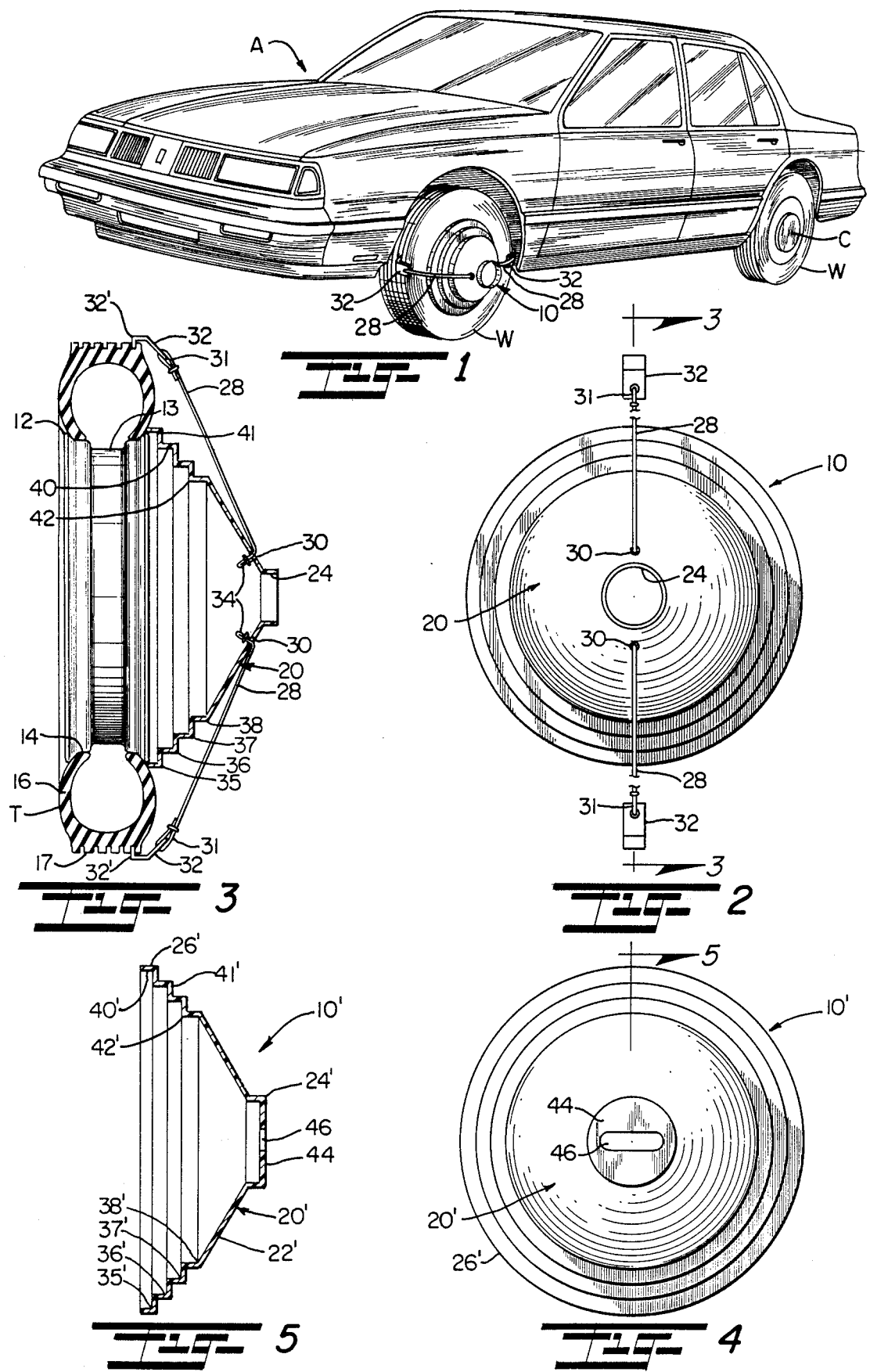

SHIELD FOR DETAILING VEHICLE TIRES

This invention relates to a detailing shield; and more particularly relates to a novel and improved shield that is conformable for use in covering and protecting different sized wheels for the purpose of detailing the sidewall of a tire.

BACKGROUND AND FIELD OF THE INVENTION

Detailing of automobile tires is customarily accomplished by spraying or otherwise applying a solution, such as, ARMORALL ® over the sidewall of the tire so as to better preserve the appearance of the sidewall and minimize any tendancy of the sidewall to crack, fade or otherwise become discolored. A particular problem associated with detailing is to completely cover the vehicle wheel so as to prevent accidental spraying of the solution onto the wheel since, unless it is quickly removed, it can be unsightly and seriously detract from the appearance of the car.

Protective shields have been devised in the past for releasably covering selected parts of a wheel or tire and for example U.S. Letters Patent No. 4,784,440 to Fair discloses a shield of generally convex configuration which is provided with a central knob for manual grasping or handling purposes and is provided with a hanger bracket to engage the flange of a wheel rim for the purpose of retaining it in place during the detailing operation. U.S. Letters Patent No. 4,792,191 shows a hand-held shield composed of a cardboard material and intended to cover a vehicle wheel during a detailing operation. U.S. Letters Patent No. 2,627,839 to Hudgins discloses a wheel mask intended for use in cleaning automobile wheels. Other patents of interest are U.S. Letters Patent Nos. 1,424,199 to Humelbau; 2,580,543 to Henderson; 3,007,401 to Kordenbrock; 3,854,448 to Kromanaker; 4,628,858 to King et al and 4,792,191 to Framer.

There continues to be a definite need for a lightweight, inexpensive protective shield or cover for vehicle wheels which can be accurately fit over the wheel in such a way as to completely shield it from accidental application of the solution applied to the sidewall in detailing and assures that the shield can be securely held in place either by the hand or by releasably securing to the wheel or tire. For manufacturing purposes it is also highly desirable that one shield can be produced and interchangeably used for different sized vehicle wheels by providing concentric markings for different sized or diameter wheels so that the shield can be easily cut to the desired size and releasably held in place over the vehicle wheel during the detailing operation.

SUMMARY OF INVENTION

Accordingly, it is an object of the present invention to provide for a novel and improved shield for detailing automobile tires which is conformable for use for different sized vehicle wheels.

Another object of the present invention is to provide for a novel and improved detailing shield for vehicle wheels which can be releasably secured to or placed over the vehicle wheel to fully protect it from application of a solution to the sidewall of the vehicle tire; and further wherein the shield is interchangeable for use on different sized vehicle wheels.

It is a further object of the present invention to provide a shield for vehicle wheels which is lightweight, inexpensive and comprised of a minimum number of parts; and further wherein a plurality of shields may be nested together for ease of shipment.

It is an additional object of the present invention to provide for a novel and improved handheld shield which greatly facilitates application of a protectant solution to the sidewalls of automobile tires without danger of spraying or running onto the vehicle wheel itself and therefore avoids time-consuming cleaning or removal of the solution from the wheel when the detailing operation is performed.

In accordance with the present invention, a temporary shield has been devised for covering a vehicle wheel of the type having an outer peripheral rim in the course of applying a detailing solution to the sidewall of a vehicle tire which is seated on the rim of the wheel and which comprises a generally disk-shaped body having a plurality of circumferentially extending markings in spaced concentric relation to one another relatively near the outer peripheral edge of the body and away from the center of the body to define circumferential lines of separation for selective removal of the circumferential portions radially outwardly of a selected marking whereby to size the body to the size of the wheel, and means for releasably disposing the body over the wheel. In the preferred form of invention, the body is of generally conical configuration and the markings are defined by circumferentially extending shoulder portions concentric to one another and to the outer peripheral portion of the wheel so that when the body is cut to size to fit a particular size of wheel the shoulder portion will fit snugly over the outer peripheral portion of the wheel. In addition the securing means for placing the body over the wheel may be defined either by hand-grasping portion at the center of the body or securing straps extending radially from the body for engagement with the tread portion of the tire.

The above and other objects, advantages and features will become more readily appreciated and understood from a consideration of the following detailed description of preferred and alternate forms of invention when taken together with the accompanying drawings:

BRIEF DESCRIPTION OF THE DRAWINGS

FIG. 1 is a perspective view illustrating the installation of a preferred form of shield over a wheel of an automobile;

FIG. 3 is a cross-sectional view taken about lines 3—3 of FIG. 2 but further illustrating mounting of the shield onto the tread portion of an automobile tire;

FIG. 4 is a front view in elevation of another preferred form of the present invention having a modified means of securing the shield to a vehicle wheel; and FIG. 5 is a cross-sectional view taken about lines 5—5 of FIG. 4.

DETAILED DESCRIPTION OF THE PREFERRED EMBODIMENT

There is shown by way of illustrative example in FIG. 1, the mounting of one preferred form of shield 10 onto a vehicle wheel W of an automobile A. In this regard, the automobile is merely a setting for use of the present invention and, as will become more readily appreciated, the shield 10 is conformable for use in other applications where it is desired to removably cover or protect an article from accidental application of material which is being applied, such as, by spraying to a surrounding surface area. In the setting as shown, typically the vehicle wheel W includes a cover C which is removably connected to the outer flange 12 of the rim 13 of the wheel, and an automobile tire T is positioned on the rim with the inner bead portion 14 of the tire seated in the rim and sidewall 16 in surrounding relation to the outer flange 12 or the wheel. Generally the outer peripheral edge of the wheel cover C is coextensive with the outer flange 12 and superimposed on the flange and, although the cover C is not illustrated in FIG. 3, it is important that the shield 10 fit snugly over the outer peripheral edges of the wheel cover C and flange 12 of the wheel W notwithstanding variations in size of the wheel cover.

Considering in more detail the construction and arrangement of the one preferred form shown in FIGS. 1 to 3, the shield 10 is broadly comprised of a generally disk-like or bowl-shaped body or shell of frustoconical configuration having an inclined wall 22 radiating outwardly from a central raised tubular portion 24 and terminating in an outer peripheral edge 26. A pair of straps 28 extend radially and outwardly in opposite directions to one another from diametrically opposed points of attachment 30 in the wall portion 22, each strap terminating in a clip or attaching member 32 for releasable attachment to tread portions 17 of the tire T. Preferably, the straps 28 are in the form of elastic cords each having an enlarged end in the form of a knotted end portion 34 to anchor one end of each cord in a limited opening or bore forming each of the attaching points 30 in the wall of the body. Each of the clips 32 is suitably comprised of a metal bracket having an angular flange 32' at its free end which can be easily inserted into one of the grooves between the upstanding tread portions 17 of the tire, and looped end portions 31 serve to fasten the clips to the ends of the cords 28. A particular advantage of employing elastic cords is that their length may be adjusted according to tire size and to assure that the necessary tension is exerted upon the body 20 when positioned over the wheel cover. Accordingly, the effective length of the cords may be adjusted by changing the position of the knotted end 34. Further latitude in adjustment is afforded by virtue of placing the clips 32 into a selected groove between treads 17 at the desired distance away from the center of the body to assure that the body is tightly held in position.

Automobile manufacturers typically offer a number of different car models and sizes, each having a different sized wheel cover C and tire T generally in accordance with the overall size and weight of the car. Accordingly it is highly desirable that the body 20 be so constructed that it can be manufactured in one size and then, if necessary, reduced to conform to the size of a specific wheel cover. Thus, as best seen from a consideration of FIGS. 2 and 3, the inclined wall 22 of the body 20 is formed with a series of circumferentially extending shoulder portions, there being a series of four shoulder portions 35, 36, 37 and 38. Each individual shoulder portion is made up of an axially extending portion 40 and radially extending portion 41 at right angles to the portion 40; and of course the outermost axially extending portion 40 also defines the outer peripheral edge portion 26. The intersection of each of the portions 40 and 41 define a stepped portion, such as, the circumferential line of intersection 42 as indicated in FIG. 3 which defines a marking or line of separation to serve as a guide for cutting or severing one or more of the shoulder portions in reducing the body to the desired circumference or size to fit a given wheel cover C. A particular advantage of forming the right angle stepped or shoulder portions as described is that the axially extending portion will fit snugly over the wheel cover and be positioned against flush against the bead portion of the tire so as to prevent any runoff or seepage of a solution into the interior or the shield.

The raised center portion 24 is suitably in the form of a sleeve or circular opening which can be grasped by the user to initially center the shield over the wheel cover followed by attachment of the clips 32 as described. The wheel cover C for different model automobiles will vary in size in accordance with variations in the size of the wheel W. Typically, for a given automobile manufacturer, there may be two or more different sized wheel covers. Accordingly, while it is desirable that a close-fitting relationship be established between the peripheral edge portion of the shield and the cover, the leading or front edge of the outermost axially extending portion 40 will bear against the sidewall portion of the tire to prevent any seepage of the solution past the edge or at least keep any runoff or seepage to a minimum. For this reason, the cord members 28 will cooperate in maintaining firm engagement between the peripheral edge 40 of the shield and the sidewall 17 by attaching the cords under sufficient tension to the tread portions as illustrated. To this end, a conventional type of bunge cord may be used and separated into two sections to make up each of the cord members 28 with a clipped end 32 as described; or in the alternative, a single cord may be passed either through or around the body 20 with opposite clip ends 32 being attached to the tread portions as described.

Another preferred form of invention is illustrated in FIGS. 4 and 5 and wherein like parts to those of the preferred form of FIGS. 1 to 3 are correspondingly enumerated with prime numerals. In the form of FIGS. 4 and 5, the body 20' of the shield 10' is identical to that in FIGS. 1 to 3, except that the attaching holes 30 are eliminated. Instead, the central raised portion 24' is provided with a closure or panel 44 including a central slotted portion 46 which is sized for convenient grasping in one hand. Thus the intent of the alternate preferred form of FIGS. 4 and 5 is to simplify the assembly of the shield and eliminate the need for any separate attaching means such as the elastic cord members 28. In other words it is necessary merely for the user to grasp the shield at the center slotted portion 46 and to manually position the shield 10' against the sidewall 16 of the tire when the detailing solution is applied to the sidewall. In the alternate preferred form as in the form of FIGS. 1 to 3 it is possible to employ a bunge cord with clips at opposite ends and which for example can be wrapped around the central raised portion and stretched away from the raised portion 24' for attachment to the tread portion 17 of the tire. Again, the shoulder portions 35' to 38' are provided for the purpose of adjusting the body 20' to the desired diameter which will best conform to the wheel cover to be protected.

It is therefore to be understood that various modifications and changes may be made in the construction and arrangement of parts comprising the preferred forms of the present invention without departing from the spirit and scope of the present invention as defined by the appended claims.

I claim:

1. A motor vehicle detailing shield for releasably covering a vehicle wheel cover having an outer peripheral rim when a detailing solution is to be applied to the sidewall of a vehicle tire seated on the rim portion of said wheel cover, said shield comprising:

a generally bowl-shaped body having an inclined wall terminating in an axially extending outer peripheral edge portion and a plurality of circumferentially extending markings in spaced concentric relation to one another and in adjacent but spaced relation to said outer peripheral edge portion, said markings describing circumferential lines of separation along said inclined wall for selective removal of circumferential portions of said body disposed radially and outwardly of a selected one of said markings whereby the diameter of said body will substantially conform to the diameter of said wheel cover; and securing means associated with said body for releasably positioning said body over said wheel cover when said solution is to be applied to the sidewall.

2. A motor vehicle detailing shield according to claim 1 said body having a central raised portion, and said inclined wall terminating in an axially extending outer peripheral edge portion at each said circumferential line of separation.

3. A motor vehicle detailing shield according to claim 1 said lines of separation disposed between circumferentially extending shoulder portions extending concentric to one another adjacent to the outer peripheral edge of said body.

4. A motor vehicle detailing shield according to claim 1 said central raised portion including said securing means in the form of manual grasping means.

5. A motor vehicle detailing shield according to claim 4, said manual grasping means defined by a slotted portion in said central raised portion of said body, said slotted portion being sized for insertion of one hand into said central raised portion for grasping and positioning said body over said wheel cover.

6. A motor vehicle detailing shield according to claim 1, said securing means including strap members extending in a radial direction from said body for releasable engagement with said tire.

7. A motor vehicle detailing shield according to claim 6, said straps defined by elastic cords each having one end adjustably connected to said body and an opposite clip end engageable with tread portions on said tire.

8. A motor vehicle detailing shield according to claim 6, said strap portions extending in diametrically opposite directions away from said body and having clip members at their free ends for releasable engagement with the tread portions on said tire.

9. An automobile detailing shield for releasably covering a vehicle wheel cover having an outer peripheral rim when a detailing solution is to be applied to the sidewall of a vehicle tire seated on the rim portion of said wheel cover comprising:

a generally bowl-shaped body having an inclined wall portion terminating in an outer peripheral edge, and a plurality of circumferentially extending shoulder portions in said wall portion disposed in spaced concentric relation to one another and to said outer peripheral edge of said body, each such shoulder portion having a radially extending surface portion and axially extending surface portion adjoining said axially extending and radially extending surface portions intersecting at a common line of separation for selective removal of circumferential shoulder portions radially outwardly of said line of separation in order to match the diameter of said body to that of said wheel cover and with the outermost axially extending surface portion extending over said wheel cover into engagement with the sidewall of said tire; and securing means for releasable disposition of said body over the wheel cover to protect said wheel cover from said solution when the solution is applied to the sidewall of the tire.

10. An automobile detailing shield according to claim 9, said body having a central raised portion and an inclined wall of generally frustoconical configuration, said lines of separation between circumferentially extending shoulder portions extending concentric to one another adjacent to the outer peripheral edge of said body.

11. An automobile detailing shield according to claim 9, said central raised portion including said securing means in the form of manual grasping means defined by a slotted portion in said central raised portion of said body sized for insertion of one hand into said central raised portion for grasping and positioning said body over said wheel cover.

12. An automobile detailing shield according to claim 9, said securing means including strap members extending in a radial direction from said body for releasable engagement with said tire, said straps defined by elastic cords each having one end adjustably connected to said body and an opposite clip end engageable with tread portions on said tire.

* * * * *